(12) United States Patent
Funck Jensen et al.

(10) Patent No.: US 12,185,725 B2
(45) Date of Patent: Jan. 7, 2025

(54) BCA CONTROL OF STB

(71) Applicant: DANSTAR FERMENT AG, Zug (CH)

(72) Inventors: Dan Funck Jensen, Uppsala (SE);
Birgit Mikkelsen, Hvidovre (DK);
Magnus Karlsson, Almunge (SE);
Margareta Hökeberg, Uppsala (SE)

(73) Assignee: DANSTAR FERMENT AG, Zug (CH)

( * ) Notice: Subject to any disclaimer, the term of this patent is extended or adjusted under 35 U.S.C. 154(b) by 823 days.

(21) Appl. No.: 16/956,237

(22) PCT Filed: Dec. 18, 2018

(86) PCT No.: PCT/SE2018/051331
§ 371 (c)(1),
(2) Date: Jun. 19, 2020

(87) PCT Pub. No.: WO2019/125294
PCT Pub. Date: Jun. 27, 2019

(65) Prior Publication Data
US 2021/0100251 A1    Apr. 8, 2021

(30) Foreign Application Priority Data
Dec. 19, 2017 (SE) .................... 1751575-0

(51) Int. Cl.
*A01N 63/30* (2020.01)
*A01N 25/30* (2006.01)
*A01N 43/12* (2006.01)

(52) U.S. Cl.
CPC ............. *A01N 63/30* (2020.01); *A01N 25/30* (2013.01); *A01N 43/12* (2013.01)

(58) Field of Classification Search
CPC ........ A01N 25/30; A01N 43/12; A01N 63/30; A01N 63/253
USPC ....................................................... 504/117
See application file for complete search history.

(56) References Cited

U.S. PATENT DOCUMENTS

2016/0007613 A1* 1/2016 Brown .................. A01N 63/30
504/117

FOREIGN PATENT DOCUMENTS

| CN | 102934632 A | * | 2/2013 | |
|---|---|---|---|---|
| EP | 2962568 A1 | | 1/2016 | |
| WO | 00/18241 A1 | | 4/2000 | |
| WO | WO-2013092224 A1 | * | 6/2013 | ............. A01N 37/50 |
| WO | 2015/011615 A1 | | 1/2015 | |
| WO | 2015/035504 A1 | | 3/2015 | |

OTHER PUBLICATIONS

Bolton, Melvin D. et al., Wheat leaf rust caused by Puccinia triticina, Molecular Plant Pathology, vol. 9, No. 5, pp. 563-575 (2008).
Perelló, Analia et al., Effect of *Trichoderma* spp. isolates for biological control of tan spot of wheat caused by Pyrenophora tritici-repentis under field conditions in Argentina, BioControl, DOI 10.1007/s10526-007-9110-4, pp. 1-10 (2006).
Liu, Na et al., Studies on the Control of Ascochyta Blight in Field Peas (*Pisum sativum* L.) Caused by Ascochyta pinodes in Zhejiang Province, China, Frontiers in Microbiology, vol. 7, No. 481, pp. 1-13 (Apr. 2016).
Jensen Birgit et al., Clonostachys rosea reduces spot blotch in barley by inhibiting prepenetration growth and sporulation of Bipolaris sorokiniana without inducing resistance, Pest Manag Sci, vol. 72, pp. 2231-2239 (2016).
Jensen, D. F. et al., Development of a biocontrol agent for plant disease control with special emphasis on the near commercial fungal antagonist Clonostachys rosea strain IK726', Australasian Plant Pathology, vol. 36, pp. 95-101 (2007).
Jensen, Birgit et al., Biological seed treatment of cereals with fresh and long-term stored formulations of Clonostachys rosea: Biocontrol efficacy against Fusarium culmorum, European Journal of Plant Pathology, vol. 106, pp. 233-242 (2000).
Comby, Morgane et al., Spatial and Temporal Variation of Cultivable Communities of Co-occurring Endophytes and Pathogens in Wheat, Frontiers in Microbiology, vol. 7, No. 403, pp. 1-16 (Mar. 2016).

* cited by examiner

*Primary Examiner* — Ali Soroush

(74) *Attorney, Agent, or Firm* — Porter Wright Morris & Arthur LLP

(57) ABSTRACT

The present invention generally relates to use of a biological control agent (BCA) in control of *Septoria tritici* blotch (STB) caused by *Mycosphaerella graminicola*. The BCA is, or comprises, *Clonostachys rosea*.

17 Claims, 3 Drawing Sheets

Specification includes a Sequence Listing.

BCA CONTROL OF STB

TECHNICAL FIELD

The present invention generally relates to use of a biological control agent (BCA) in control of *Septoria tritici* blotch (STB).

BACKGROUND

*Septoria tritici* blotch (STB), also referred to as *Septoria* leaf blotch, is caused by the filamentous fungus *Mycosphaerella graminicola* (older name *Septoria tritici*). *Mycosphaerella graminicola* is the name for the sexual stages of the fungus (teleomorph name). The corresponding name for the asexual stage of the fungus (anamorph name) is *Zymoseptoria tritici.*

STB caused by the ascomycete fungus *Mycosphaerella graminicola* is one of the most important foliar diseases of wheat. STB is characterized by necrotic lesions, see FIG. 1, on leaves and stems that develop after infected cells collapse, and is more prevalent during cool, wet weather. It is currently the most important disease of wheat in Europe and is among the top two or three most economically damaging diseases of this crop in the United States. Extensive applications of fungicides increase the worldwide economic costs attributed to STB.

A major problem with STB is that it is difficult to control due to resistance to multiple fungicides. The pathogen affects both bread wheat (*Triticum aestivum* L.), including winter wheat, and durum wheat (*T. turgidum* [L.] ssp. *durum*).

The initial symptoms of STB are small chlorotic spots on the leaves that appear soon after seedlings emerge in the fall or spring. As they enlarge, the lesions, see FIG. 2, become light tan and develop darker colored fruiting bodies, see FIG. 3. Lesions on mature leaves most often are long, narrow and delimited by leaf veins but can also be shaped irregularly or can be elliptical, particularly on seedlings or leaves that were young when infected. Mature lesions contain black or brown fruiting structures, the asexual pycnidia or sexual pseudothecia. The pycnidia or pseudothecia develop in the substomatal cavities of the host so are spaced regularly within the lesions, see FIG. 3.

STB is found commonly in the same fields and on the same plants as *Phaeosphaeria nodorum* (asexual stage: *Stagonospora nodorum*), the causal agent of *Stagonospora nodorum* blotch of wheat. When both pathogens occur together, they are referred to collectively as the *Septoria* blotch complex or *Septoria* complex.

The lifestyle of *M. graminicola* is hemibiotrophic. This means it is biotrophic early in the infection process, deriving its nutrition from the apoplast around living cells, then kills the surrounding host cells and becomes necrotrophic (utilizing dead tissue) during the later stages of infection, see FIG. 8. Infection of wheat by *M. graminicola* is thus characterized by two stages with at least five phases:

Stage 1—Biotrophic Growth:

i. Initial growth of the hyphae on the leaf surface; 0-24 hours after contact.

ii. Host penetration via natural openings, the stomata; 24-48 hours after contact, see FIG. 4.

iii. Intercellular biotrophic phase as hyphae extend within mesophyll tissue and obtain nutrients from the plant apoplast; 2-12 days after contact, see FIGS. 5-7.

Stage 2—Necrotrophic Growth:

iv. A rapid change to necrotrophic growth associated with the appearance of lesions on the leaf surface and collapse of the plant tissue; approximately 12-14 days after contact.

v. Further colonization of mesophyll tissue, see FIG. 8, and formation of pycnidia with conidia in substomatal cavities of senescent tissue; 14-28 days after contact.

During the necrotrophic stage, the hyphae macerate host cells causing collapse. Involvement of a toxin in the switch from biotrophic to necrotrophic growth is suspected.

Infection by *M. graminicola* is initiated by air-borne ascospores and splash-dispersed conidia produced on residues of the crop of the previous season, see FIG. 9. Primary infection occurs soon after seedlings emerge in fall (for winter wheat) or spring. Ascospore germ tubes are attracted to the stomata, through which they gain entry into the sub-stomatal cavity either directly or after production of an appressorium-like structure (infection cushion). For several days the hyphae grow intercellularly with little increase in biomass.

After the switch from biotrophic to necrotrophic growth, cells collapse, lesions form and are identified initially by small, yellow flecks or blotches. The lesions expand, primarily in the direction of the leaf veins to form long, narrow, necrotic blotches. Pycnidia develop around stomata within the necrotic areas of the lesions and exude conidia in gelatinous, hygroscopic cirrhi. These spores are disseminated by rain splash to leaves of the same or nearby plants. The pathogen survives crop-free periods primarily as pseudothecia but also in pycnidia on crop debris. Autumn-sown crops and volunteer plants can aid survival over winter.

*Journal of Plant Diseases and Protection* (1997), 104(6): 588-598 tested the suitability of *Trichoderma harzianum* and *Gliocladium roseum* as biocontrol agents for *Septoria tritici* and their efficiency in reducing disease severity on wheat plants under greenhouse conditions. There were no significant differences between wheat plants treated with the biocontrol agents and the control.

There is a need for an efficient treatment for STB, in particular in the light of the ever-increasing problem with fungicide-resistant *M. graminicola.*

SUMMARY

It is a general objective to provide an efficient treatment for STB.

This and other objectives are met by the embodiments as defined herein.

An aspect of the embodiments relates to use of *Clonostachys rosea* in inhibiting and/or controlling STB caused by *Mycosphaerella graminicola.*

Another aspect of the embodiments relates to a method of inhibiting and/or controlling STB caused by *M. graminicola*. The method comprises treating a wheat plant infected by *M. graminicola* with *C. rosea* or a biological control agent (BCA) composition comprising *C. rosea* and at least one auxiliary compound.

*C. rosea* strains can be used as efficient BCAs in inhibiting and/or controlling STB in wheat plants infected by *M. graminicola*. The *C. rosea* strains may also be combined with traditional chemical fungicide-based STB treatments.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 2:
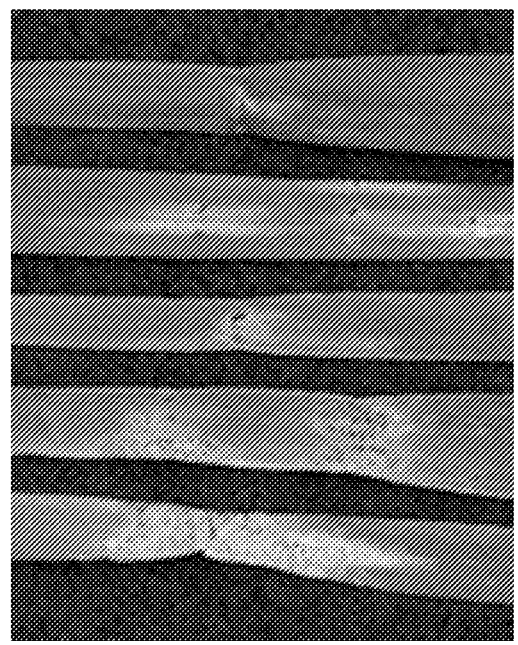
FIG. 2 illustrates lesions on wheat leaves caused by STB.
Figure 1:
FIG. 1 illustrates necrotic lesions on wheat leaves caused by STB.
Figure 3:
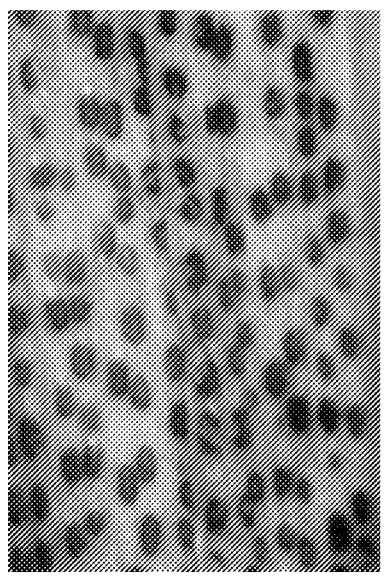
FIG. 3 illustrates fruiting bodies on wheat leaves caused by STB.
Figure 4:
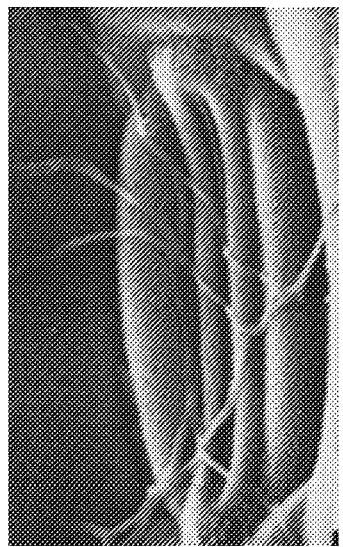
FIG. 4 illustrates penetration of *M. graminicola* via the stomata in wheat plants.
Figure 5:
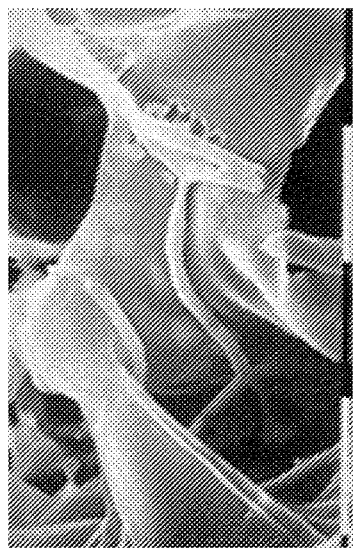
FIGS. 5-7 illustrate the extension of the *M. graminicola* hyphae within mesophyll tissue in wheat plants.
Figure 6:
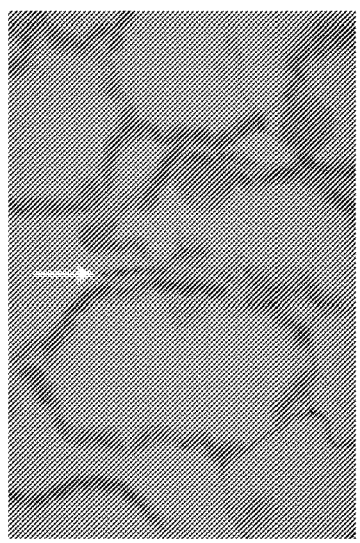
Figure 7:
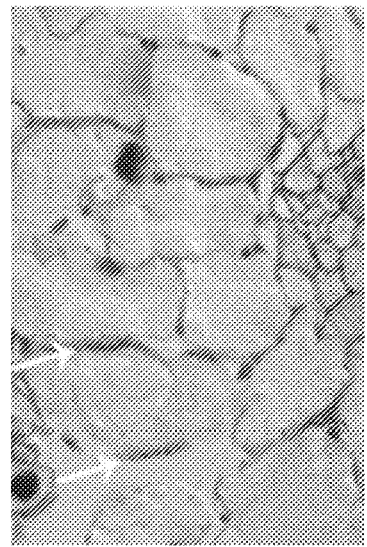
Figure 8:
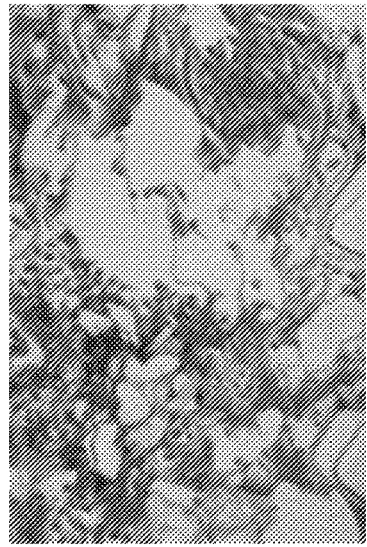
FIG. 8 illustrates formation of *M. graminicola* pycnidia with conidia in substomatal cavities of senescent tissue in wheat plants.
Figure 9:
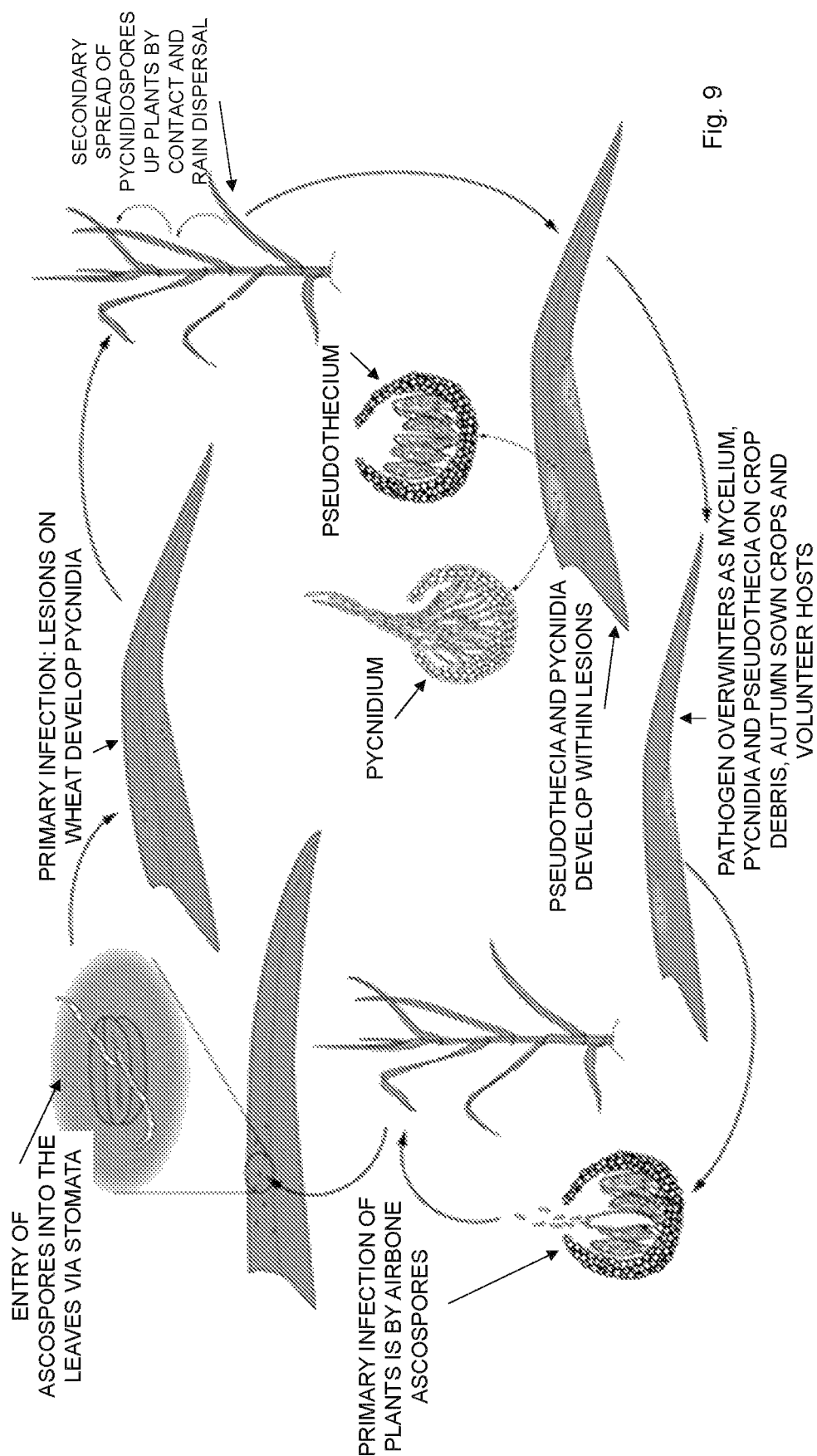
FIG. 9 illustrates infection of wheat plants by *M. graminicola* and development of STB.

The present invention generally relates to use of a biological control agent (BCA) in control of *Septoria tritici* blotch (STB).

STB caused by the ascomycete fungus *Mycosphaerella graminicola* is today one of the most important diseases of wheat. As a consequence, a vast amount of money is spent on combating STB, mainly by the usage of fungicides. However, fungicide resistance is becoming a major problem in STB with ever more *M. graminicola* strains becoming resistant to the fungicides traditionally used to treat or prevent STB.

Furthermore, *M. graminicola* is quite different from other leaf-disease-causing fungi in the way it causes disease first by its growth on the leaf surface and then entering through the natural openings (stomata) in the leaves. *M. graminicola* will have a long biotrophic stage, in which you generally do not see any symptoms (stage 1 mentioned in the background section). It is first when it goes into the necrotrophic stage (stage 2 mentioned in the background section) that any symptoms appear.

Most leaf pathogens have spores (conidia) landing on the leaves, where they germinate and penetrate directly into the leaf with no or very short time before the symptoms appear. For instance, leaf diseases caused by *Bipolaris sorokiniana* and *Drechslera teres* involve the production of toxins and killing of the plant cells at the time of infection. This is quite different from the disease progress in STB.

*Journal of Plant Diseases and Protection* (1997), 104(6): 588-598 tested the suitability of *Trichoderma harzianum* and *Gliocladium roseum* as biocontrol agents for *Septoria tritici* and their efficiency in reducing disease severity on wheat plants under greenhouse conditions. There were no significant differences between wheat plants treated with the biocontrol agents and the control. The authors concluded that there is often a low correlation between the effects achieved by biocontrol agents in vitro and the effectiveness to control disease in vivo.

In this article, a spore suspension of the *T. harzianum* isolate T15 or the *G. roseum* isolate G10 was sprayed on wheat seedlings prior to application of a suspension of *S. tritici* spores.

The inventors have used BCAs in terms of *Clonostachys rosea* strains (older name *Gliocladium roseum*) in field trials. These *C. rosea* strains achieved a significant control of STB as compared to control treatment. This significant control of STB was achieved by applying *C. rosea* strains on wheat plants already infected by *M. graminicola*. The significant effects achieved by the invention were highly surprising given that the article in *Journal of Plant Diseases and Protection* stated that the *G. roseum* isolate G10 had no effect in vivo on STB.

Thus, the present invention is directed towards use of *C. rosea* in inhibiting and/or controlling STB caused by *M. graminicola* (*Z. tritici*, *S. tritici*).

In an embodiment, *C. rosea* is selected from the group consisting of *C. rosea f. rosea*, *C. rosea f. catenulata*, and a mixture thereof.

*C. rosea f. rosea*, also known as *Gliocladium roseum*, and *C. rosea f. catenulata*, also known as *G. catenulatum*, are fungi in the family Bionectriacea. *C. rosea* colonized living plants as an endophyte, digests material in soil as a saprophyte and can also be used as a mycoparasite of other fungi and of nematodes.

In an embodiment, *C. rosea* is selected from the group consisting of *C. rosea* strain IK726, *C. rosea* strain 1829, *C. rosea* strain 1882, *C. rosea* strain 2177, *C. rosea* strain CBS 103.94, and a mixture thereof. Experimental data as presented herein shows that all of these *C. rosea* strains could be used as a BCA to inhibit and/or control STB.

Further *C. rosea* strains that can be used according to the invention are listed in Tables 5 to 7.

In an embodiment, *C. rosea* is used in inhibiting and/or controlling STB caused by *M. graminicola* on wheat plants infected by *M. graminicola*.

Thus, the invention preferably achieves a treatment, inhibition or control of STB in wheat plant already infected by *M. graminicola*.

Another aspect of the embodiments relates to a method of inhibiting and/or controlling STB caused by *M. graminicola*. The method comprises treating or contacting a wheat plant infected by *M. graminicola* with *C. rosea* or a BCA composition comprising *C. rosea* and at least one auxiliary compound.

In an embodiment, treating the wheat plant comprises spraying the *C. rosea* or the BCA composition onto at least a portion of the wheat plant.

For instance, *C. rosea* BCA or the BCA composition could be suspended in water to form a spray that can be applied to the wheat plant and/or seed in the form of a spray. *C. rosea* may advantageous be suspended in water in the form of a dry formulation according to Jensen et al. (2002). In brief, the dry formulation may be prepared by autoclaving a mixture of sphagnum, wheat bran and water (15:26:59 w/w/w) for 20 minutes on two successive days and then inoculated with two agar plugs of a strain of *C. rosea* and incubated in 250 ml Erlenmeyer flasks at room temperature for 14 days. The inoculum may be air-dried, milled in a coffee mill and then stored in sealed air-tight bags at 4° C. until use. Alternatively, or in addition, *C. rosea* may be suspended in water as spores.

In an embodiment, spraying *C. rosea* or the BCA composition comprises spraying the *C. rosea* or the BCA composition onto at least one of a pre-stem extension, a stem extension, and a leaf of the wheat plant.

When treating a wheat plant with *C. rosea* or the BCA composition the wheat plant can be treated with *C. rosea* or the BCA composition, such as by spraying, at various growth stages (referred to as GS in the following) of the wheat plant, including at early growth stages and/or at late growth stages.

For instance, the wheat plant can be treated with *C. rosea* or the BCA composition once at an early growth stage, multiple times at an early growth stage, once at a medium growth stage, multiple times at a medium growth stage, once at a late growth stage, multiple times at a late growth stage, once or multiple times at an early growth stage and once or multiple times at a medium growth stage, once or multiple times at an early growth stage and once or multiple times at a late growth stage, once or multiple times at a medium growth stage and once or multiple times at a late growth stage, or once or multiple times at an early growth stage, once or multiple times at a medium growth stage and once or multiple times at a late growth stage.

Early, medium and late growth stages are preferably as defined in the BBCH scale for wheat (cereals).

An early growth stage as used herein corresponds to growth stages within the range of GS 10-39, including leaf development, tillering and stem elongation stages. A late growth stage as used herein correspond to growth stages within the range of GS 61-89, including flowering, anthesis, development of fruit and ripening. A medium growth stage is a growth stage intermediate an early growth stage and a late growth stage and includes growth stages within the range of GS 41-59, including booting, inflorescence emergence and heading.

In addition to treating a wheat plant infected by *M. graminicola* also a plant substrate, in which the wheat plant is growing or to be grown, can be treated with *C. rosea* or the BCA composition, such as by adding *C. rosea* or the BCA composition comprising *C. rosea* and at least one auxiliary compound to the plant substrate.

The plant substrate can be any plant substrate commonly used to growth seeds or plants of wheat. Non-limiting but preferred examples of such plant substrates include soil, peat, compost, vermiculite, perlite, sand, rockwool or other types of inert material as well as substrates based on plant material, e.g., saw dust, waste of coco or stem and leaf material, or clay.

In the above described embodiments, *C. rosea* is preferably selected from the group consisting of *C. rosea f. rosea, C. rosea f. catenulata*, and a mixture thereof. For instance, *C. rosea* is selected from the group consisting of *C. rosea* strain IK726, *C. rosea* strain 1829, *C. rosea* strain 1882, *C. rosea* strain 2177, *C. rosea* strain CBS 103.94, and a mixture thereof, i.e., a mixture of two or more of the listed *C. rosea* strains.

In an embodiment, the at least one auxiliary compound in the BCA composition comprises a surfactant. Such a surfactant is a preferred auxiliary compound to keep *C. rosea*, such as spores of *C. rosea*, separated in a water suspension to prevent or at least reduce the risk of clump formation.

The surfactant is preferably a nonionic surfactant. Examples of such nonionic surfactants include polysorbate surfactants. Hence, in an embodiment the surfactant is selected from the group consisting of polysorbate 20 (polyoxyethylene (20) sorbitan monolaurate), polysorbate 40 (polyoxyethylene (20) sorbitan monopalmitate), polysorbate 60 (polyoxyethylene (20) sorbitan monostearate), polysorbate 80 (polyoxyethylene (20) sorbitan monooleate), and a mixture thereof. In a particular embodiment, the surfactant is polysorbate 20, also known as TWEEN® 20.

The surfactant could be included in the BCA composition in a concentration of from 0.001 up to 5%, (v/v) such as from 0.005 up to 1%, preferably from 0.01 up to 0.5%, such as about 0.1% of the BCA composition.

In an embodiment, the at least one auxiliary compound comprises at least one fungicide.

In these embodiments, the BCA composition comprises one fungicide or multiple, i.e., at least two, fungicides. The at least one fungicide is advantageously selected from fungicides traditionally used to treat or combat STB.

For instance, the at least one fungicide is selected from the group consisting of a demethylation inhibitor (DMI), an amine, a succinate-dehydrogenase inhibitor (SDHI), a quinone-outside inhibitor (QoI), a thiophene carboxamide, an anilino-pyrimidine (AP), an azanaphthalene, a phenylpyrrole (PP), a dicarboximide, a benzo-thiadiazole (BTH), a methyl benzimidazole carbamate (MBC), a phenyl-acetamide, an aryl-phenyl-ketone, a dithiocarbamate, a phtalimide, a chloronitrile, a bis-guanidine, and a mixture thereof.

In an embodiment, the DMI is selected from the group consisting of a piperazine, preferably triforine; a pyridine, preferably pyrifenox or pyrisoxazole; a pyrimidine, preferably fenarimol or nuarimol; an imidazole, preferably imazalil, oxpoconazole, pefurazoate, prochloraz or triflumizole; a triazole, preferably azaconazole, bitertanol, bromuconazole, cyproconazole, difenoconazole, diniconazole, epoxiconazole, etaconazole, fenbuconazole, fluquinoconazole, flusilazole, flutriafol, hexaconazole, imibenconazole, ipconazole, metconazole, myclobutanil, penconazole, propiconazole, prothioconazole, simeconazole, tebuconazole, tetraconazole, triadimefon, triadimenol, or triticonazole; and a mixture thereof.

In an embodiment, the amine is selected from the group consisting of a morpholine, preferably aldimorph, dodemorph, fenpropimorph or tridemorph; a piperidine, preferably fenpropidin or piperalin; a spiroketalamine, preferably spiroxamine; and a mixture thereof.

In an embodiment, the SDHI is selected from the group consisting of a phenyl-benzamide, preferably benodanil, flutolanil or mepronil; a phenyl-oxo-ethyl thiophene amid, preferably isofetamid; a pyridinyl-ethyl-benzamide, preferably fluopyramin; a pyridinyl-ethyl-benzamide, preferably fluopyram; a furan carboxamide, preferably fenfuram; an oxathiin carboxamide, preferably carboxin or oxycarboxin; a thiazole carboxamide, preferably thifluzamide; a pyrazole-4 carboxamide, preferably benzovindiflupyr, bixafen, fluxapyroxad, furametpyr, isopyrazam, penflufen, penthiopyrad or sedaxane; a N-methoxy-(phenyl-ethyl)-pyrazole carboxamide, preferably pydiflumetofen; a pyridine carboxamide, preferably boscalid; a pyrazine carboxamide, preferably pyraziflumid; and a mixture thereof.

In an embodiment, the QoI is selected from the group consisting of a methoxy acrylate, preferably azocystrobin, coumoxystrobin, enoxastrobin, flufenozystrobin, picozystrobin or pyraozystrobin; a methoxy acetamide, preferably mandestrobin; a methoxy carbamate, preferably pyraclostrobin, pyrametostrobin or triclopyricarb; an aximino acetate, preferably kresoxim-methyl or trifloxystrobin; an oximino acetamide, preferably dimoxystrobin, fenaminstrobin, metominostrobin or orysastrobin, an oxazolinde dione, preferably famoxadone, a dihydro dioxazine, preferably fluoxastrobin, an imidazolinone, preferably fenamidone; a benzyl carbamate, preferably pyribencarb; and a mixture thereof.

In an embodiment, the thiophene carboxamide is preferably silthiofam.

In an embodiment, the AP is selected from the group consisting of cyprodinil, mepanipyrim, pyrimethanil, and a mixture thereof.

In an embodiment, the azanaphthalene is selected from the group consisting of an aryloxyquinoline, preferably quinoxyfen; a quinazolinone, preferably proquinazid; and a mixture thereof.

In an embodiment, the PP is selected from the group consisting of fenpiclonil, fludioxonil, and a mixture thereof.

In an embodiment, the dicarboximide is selected from the group consisting of chlozolinate, dimethachlone, iprodione, procymdone, vinclozolin, and a mixture thereof.

In an embodiment, the BTH is acibenzolar-S-methyl.

In an embodiment, the MBC is selected from the group consisting of a benzimidazole, preferably benomyl, carbendazim, fuberidazole or thiabendazole; a thiophanate, preferably thiphanate or thiphanate-methyl; and a mixture thereof.

In an embodiment, the phenyl-acetamide is cyflufenamid.

In an embodiment, the aryl-phenyl-ketone is selected from the group consisting of a benzophenone, preferably metrafenone; a benzoylpyridine, preferably pyriofenone; and a mixture thereof.

In an embodiment, the dithiocarbamate is selected from the group consisting of ferbam, macozeb, maneb, metiram, propineb, thiram, zinc thiazole, zoneb, ziram, and a mixture thereof.

In an embodiment, the phtalimide is selected from the group consisting of captan, captafol, folpet and a mixture thereof.

In an embodiment, the chloronitrile is chlorothalonil.

In an embodiment, the bis-guanidine is selected from the group consisting of guazatine, iminoctadine, and a mixture thereof.

In a particular embodiment, the at least one fungicide is selected from the group consisting of boscalid, epoxiconazole, iprodione, metconazole, propiconazole, prothioconazole, pyraclostrobin, tebuconazole, and a mixture thereof.

The at least one fungicide may, for instance, be selected from commercially available fungicides including Bell (boscalid+epoxiconazole), Bumper 25 EC (propiconazole), Juventus 90 (metconazole), Osiris star (epoxiconazole+metconazole), Proline EC 250 (prothioconazole), Rubric (epoxiconazole), Prosaro 250 EC (tebuconazole+prothioconazole) and Viverda (epoxiconazole+boscalid+pyraclostrobin).

*C. rosea* strains can tolerate high dosages of active ingredients in commonly used chemical fungicides. For instance, experimental data as presented herein indicates that *C. rosea* strains can tolerate two commonly used active ingredients in fungicides; prothioconazole and iprodione.

In an embodiment, the at least one auxiliary compound comprises at least one insecticide.

The at least one insecticide can include a single insecticide or a mixture of multiple insecticides commonly used to protect wheat. A typical example of such an insecticide is furathiocarb.

In an embodiment, the at least one auxiliary compound comprises at least one herbicide.

In an embodiment, the at least one herbicide is selected from the group consisting of an acetyl coenzyme A carboxylase inhibitor, an acetolactate synthase inhibitor, an enolpyruvylshikimate 3-phosphate synthase inhibitor, a synthetic auxin herbicide, a photosystem II inhibitor, a photosystem I inhibitor, a 4-hydroxyphenylpyruvate dioxygenase inhibitor, and a mixture thereof.

In an embodiment, the at least one auxiliary comprises at least one BCA other than *C. rosea*.

For instance, the at least one BCA other than *C. rosea* may be selected from the group consisting of a *Bacillus* BCA, a *Serratia* BCA, a *Trichoderma* BCA, *Metarhizium brunneum, Glomus intraradices, Pseudomonas* BCA, and a mixture thereof. In a particular embodiment, the at least one BCA other than *C. rosea* is *Pseudomonas chlororaphis*.

The above described embodiments may be combined. Hence, the BCA composition may comprise, in addition to *C. rosea*, at least one surfactant and at least one fungicide; at least one surfactant and at least one insecticide; at least one surfactant and at least one herbicide; at least one surfactant and at least one BCA other than *C. rosea*; at least one fungicide and at least one insecticide; at least one fungicide and at least one herbicide; at least one fungicide and at least one BCA other than *C. rosea*; at least one insecticide and at least one herbicide; at least one insecticide and at least one BCA other than *C. rosea*; at least one herbicide and at least one BCA other than *C. rosea*; at least one surfactant, at least one fungicide and at least one insecticide; at least one surfactant, at least one fungicide and at least one herbicide; at least one surfactant, at least one fungicide and at least one BCA other than *C. rosea*; at least one surfactant, at least one insecticide and at least one herbicide; at least one surfactant, at least one insecticide and at least one BCA other than *C. rosea*; at least one surfactant, at least one herbicide and at least one BCA other than *C. rosea*; at least one fungicide, at least one insecticide and at least one herbicide; at least one fungicide, at least one insecticide and at least one BCA other than *C. rosea*; at least one fungicide, at least one herbicide and at least one BCA other than *C. rosea*; at least one insecticide, at least one herbicide and at least one BCA other than *C. rosea*; at least one surfactant, at least one fungicide, at least one insecticide and at least one herbicide; at least one surfactant, at least one fungicide, at least one insecticide and at least one BCA other than *C. rosea*; at least one surfactant, at least one insecticide, at least one herbicide and at least one BCA other than *C. rosea*; at least one fungicide, at least one insecticide, at least one herbicide and at least one BCA other than *C. rosea*; or at least one surfactant, at least one fungicide, at least one insecticide, at least one herbicide and at least one BCA other than *C. rosea*.

The application of *C. rosea* or the BCA composition of the invention onto plant of wheat, and optionally into the plant substrate, can be combined with chemical fungicide treatment. For instance, soil treatment could be performed at the time of sowing as both BCA treatment, i.e., with *C. rosea* or the BCA composition of the invention, and chemical fungicide treatment. Alternatively, or in addition, treatment could take place at the growing season of the wheat plant, such as a combined BCA and chemical fungicide treatment, or separate BCA and fungicide treatment, such as alternating BCA treatment and chemical fungicide treatment.

A further alternative, which can be used instead or as a complement to any of the other treatment options above or below, is to perform BCA treatment during the pre-harvest interval (PHI). It is also possible to perform post-harvest treatment using the BCA treatment or using BCA and fungicide treatments.

A further option, which can be used alone or combined with any of the alternatives above, is to perform BCA treatment of the soil and/or straw of wheat plants following harvest, i.e., in between crops.

Further aspects of the embodiments relates to usage of *C. rosea* strain 1829, *C. rosea* strain 1882, *C. rosea* strain 2177 as described herein. *C. rosea* strain 1829 was isolated from potato tuber (cultivar Eros) from a field near Vodice, Slovenia. *C. rosea* strain 1882 was isolated from eggs of *Diabrotica virgifera* incubated in soil from a field near Ljubljana, Slovenia. *C. rosea* strain 2177 was isolated from soil, 10 cm below the surface, from a field near Dolenji Novaki, Slovenia. The *C. rosea* strains are effective in combating STB as shown in the experimental section. These *C. rosea* strains are furthermore tolerant to the fungicides prothioconazole and iprodione, and also show growth under cold conditions. The genome of the three *C. rosea* strains has been sequenced and are presented in SEQ ID NO: 1 for *C. rosea* strain 1829, SEQ ID NO: 2 for *C. rosea* strain 1882 and SEQ ID NO: 3 for *C. rosea* strain 2177.

Further aspects relates to the use of *C. rosea* in preventing, inhibiting and/or controlling brown rust.

Hence, an embodiment relates to use of *Clonostachys rosea* in preventing, inhibiting and/or controlling brown rust caused by *Puccinia triticina*.

Another embodiment relates to a method of preventing, inhibiting and/or controlling brown rust caused by *Puccinia triticina*. The method comprises treating a plant or a seed of a plant with *Clonostachys rosea* or a biological control agent (BCA) composition comprising *C. rosea* and at least one auxiliary compound.

A further embodiment relates to a method of preventing, inhibiting and/or controlling brown rust caused by *Puccinia triticina*. The method comprises adding *Clonostachys rosea* or a biological control agent (BCA) composition comprising *C. rosea* and at least one auxiliary compound to a plant substrate. The method also comprises growing a seed of a plant or a plant in the plant substrate.

The previously described embodiments of suitable *C. rosea* strains, types of treatments and auxiliary compounds also apply to the above described uses of *C. rosea*.

EXAMPLES

Example 1—Field Experiments

Materials and Methods

The treatments compared in the field experiments 2013, 2015 and 2016 were either spraying the recommended dose of fungicide or application of the BCA *Clonostachys rosea* strain IK726 at growth stage 61 (GS 61) and determining the effect on *Fusarium* head blight (FHB), also referred to as *Fusarium* ear blight (FEB) or scab, and *Septoria tritici* blotch (STB). In 2015 and 2016, the effect of combining *C. rosea* with a BCA based on the bacterial strain *Pseudomonas chlororaphis* MA342 was also tested. In year 2015 the effects on STB of spraying different doses of *C. rosea* IK726 and the bacterial strain *P. chlororaphis* MA342 were tested. Specific treatments for each year are listed in Tables 1, 2 and 3.

The field experiment in 2017 differed from the other years by comparing five different *C. rosea* strains (*C. rosea f. rosea* and *C. rosea f. catenulata* isolated from different localities) against STB. 2017 also differed by introducing an early cover spray with the biocontrol agents at GS 37 substituting the early chemical fungicide cover spray in some of the treatments, see experimental procedure below. Table 4 gives an overview of each treatment.

Experimental Procedure

Experiments were carried out according to the Principles of Good Experimental Practice GEP under the direction of Dr. Lise Nistrup Jørgensen at the testing unit of Aarhus University, Department of Agroecology, Flakkebjerg, Forsøgsvej 1, DK-4200 Slagelse, Denmark.

The experimental design was a randomized complete block with four replicates and a plot size of 14.4-25.0 m$^2$.

The fungicides and the BCAs were applied with a self-propelled sprayer using low pressure (2.4 bar), Nardi flat fan nozzles, green ISO 015 and 150 l/ha.

Growth stages (Crop Maturity Stage) and Crop stage scale BBCH were defined according to Lancashire et al. (1991), which is modified from the scale of Zadoks: www.agric.wa.gov.au/grains/zadoks-growth-scale.

Two low dose cover sprays were applied at GS 31 and GS 37 to protect against main leaf diseases including STB. In field experiment 2017 this early fungicide sprays were substituted with biocontrol sprays in several treatments—see Table 4.

All plots in all years were artificially inoculated with a mixture of *Fusarium graminearum* and *Fusarium culmorum* at the beginning of GS 61 using 2×10.000 spores/ml in a water suspension complemented with 0.1% TWEEN® 20. There was no inoculation with *Septoria tritici* as the pathogen was present naturally in the field, causing disease in spite of the chemical fungicide cover sprays at the early stages GS 31 and GS 37.

BCAs

*C. rosea* strain IK726 (IK726) from Denmark.
*C. rosea* strain 1829 (CR1) from Slovenia.
*C. rosea* strain 1882 (CR2) from Slovenia.
*C. rosea* strain 2177 (CR3) from Slovenia.
*C. rosea* CBS 103.94 strain (CR4) from the CBS type collection in the Netherlands.
*Pseudomonas chlororaphis* (PC) strain MA342 from Sweden.

The *C. rosea* strain IK726 was used in 2013, 2015, and 2016. *C. rosea* strain IK726, *C. rosea* strain 1829, *C. rosea* strain 1882, *C. rosea* strain 2177 and *C. rosea* strain CBS 103.94 were used in 2017.

Production of Inoculum and Spray Formulations

*C. rosea* strains were in 2015, 2016 and 2017 propagated on wheat bran and formulated as a dry formulation according to Jensen et al. (2002). The dry formulated BCA was suspended in water complemented with 0.1% TWEEN® 20. In 2013 the inoculum of strain IK726 was made up of fresh spores harvested directly from cultures on potato dextrose agar (PDA) plates without prior drying before suspension in water and use for spray application.

The bacterial *P. chlororaphis* strain MA342 was propagated in liquid bacteriological media known in the art, e.g. a *Pseudomonas* liquid medium made up by mixing 30 g soy peptone, 5 g NaCl, 2.5 g K$_2$HPO$_4$ and 30 g glucose in 1000 ml H$_2$O, and suspended in water +0.1% TWEEN® 20 for spray applications.

Application Time for BCAs or Chemical Pesticides

Application time of biocontrol agents or pesticides is listed as application codes in the tables (Table 1, 2, 3 and 4). The application codes are as follows:

2013 (Table 1)

Code A=15.05.2013 (GS 32); Code B=04.06.2013 (GS 39-45); Code C=17.06.2013 (GS 61-69), Code D=18.06.2013 (GS 61-69), *Fusarium* inoculum was done at code C and the BCA treatment was either ½ day before *Fusarium* inoculum at code C or one day after *Fusarium* inoculation (code D).

2015 (Table 2)

Code A=27.04.2015 (GS 32); Code B=20.05.2015 (GS 39-45); Code C=22.06.2015 (GS 61-69).

2016 (Table 3)

Code A=10.05.2016 (GS 32); Code B=24.05.2016 (GS 39-45); Code C=04.06.2016 (GS 61-69).

2017 (Table 4)

Code A=26.05.2017 (GS 37-39); Code B=14.06.2017 (GS 61-65).

Application of BCAs

The spore concentrations were adjusted to give the following concentrations colony forming units (cfu) per $m^2$ with full dose applications:
- 2013: IK726: $1.35 \times 10^7$ cfu/$m^2$
- 2015: IK726: $7.0 \times 10^6$ cfu/$m^2$; MA342: $6.0 \times 10^8$ cfu/$m^2$
- 2016: IK726: $6.8 \times 10^6$ cfu/$m^2$; MA342: $4.5 \times 10^8$ cfu/$m^2$
- 2017: All five strains of *C. rosea* were spray inoculated in concentrations of $7.2 \times 10^6$ cfu/$m^2$ for each inoculation either at a late application (application code B) or both at an early and a late application (application code A+B) as shown in Table 4. A single early application of *C. rosea* strain IK726 (Code A) was also tested but not for the other 4 strains.

Mixed applications (2015 and 2016) were full dose: *C. rosea* IK726 full dose mixed with *P. chlororaphis* MA342 full dose. Reduced dosages used in year 2015 (shown in Table 2 as rate 100=100%, rate 50=50% and rate 10=10% of full dose) were calculated from full dosage of each organisms and then mixed before applications.

Disease assessments were carried out as percent coverage of all green leaves by the individual disease (Disease or pest severity=PESSEV). Registered diseases in the experiments were STB (*Septoria tritici* blotch, causal agent *Septoria tritici*), FHB (*Fusarium* head blight, causal agent(s) *Fusarium* spp) and brown rust (causal agent *Puccinia triticina*). Only results concerning STB are included in the Table 1-Table 3. In Table 4 (results from year 2017), results on biocontrol of brown rust caused by *Puccinia triticina* are also included.

EPPO Guidelines

The trials were carried out using the EPPO guidelines. In most cases, the assessment methods used are identical to EPPO (EPPO Guidelines PP 1/26(4), PP 1/135(4), PP 1/152 (4) and PP 1/181(4)). Leaf disease assessments were carried out on individual leaves.

Statistical Analysis

The datasets from the whole experiment from each year were subjected to analysis of variance and treatment means were separated at the 95% probability level using F-test. Treatments with the same letter are not significantly different when the method student-Newman-Keuls (P=0.05) is used.

Overview of application methods and equipment used with the field experiment from 2015 (Table 2) as an example.

Application Information

| | Application code | | |
|---|---|---|---|
| | A | B | C |
| Application Date: | Apr. 27, 2015 | May 20, 2015 | Jun. 22, 2015 |
| Application Method: | SPRAY | SPRAY | SPRAY |
| Application Placement: | FOLIAR | FOLIAR | FOLIAR |

Application Equipment

| | A | B | C |
|---|---|---|---|
| Appl. Equipment: | FL-Fung150 | FL-Fung150 | FL-Fung150 |
| Equipment Type: | SPRPNE | SPRPNE | SPRPNE |
| Operation Pressure | 2.4 BAR | 2.4 BAR | 2.4 BAR |
| Nozzle Type: | Minidrift | Minidrift | Minidrift |
| Nozzle Size: | 015 green | 015 green | 015 green |
| Nozzle Spacing: | 50 Cm | 50 Cm | 50 Cm |
| Nozzles/Row: | 5 | 5 | 5 |
| Band Width | 2.5 m | 2.5 m | 2.5 m |
| % Coverage: | 100 | 100 | 100 |
| Boom ID: | 1-6 | 1-6 | 1-6 |
| Boom Length | 250 cm | 250 cm | 250 cm |
| Boom Height | 50 cm | 50 cm | 50 cm |
| Ground Speed | 4.5 KPH | 4.5 KPH | 4.5 KPH |
| Carrier: | WATER | WATER | WATER |
| Spray Volume | 150 L/ha | 150 L/ha | 150 L/ha |
| Mix Size | 3 liters | 3 liters | 3 liters |
| Propellant: | COMAIR | COMAIR | COMAIR |
| Tank Mix (Y/N): | Y | Y | Y |

Test Products 2013

Chemical Fungicides:
  Bell (boscalid 233 g/l+epoxiconazole 67 g/l);
  Bumper 25 EC (propiconazole 250 g/l);
  Proline EC 250 (prothioconazole 250 g/l).
BCAs:
  *C. rosea* strain IK726.

Chemical fungicide (Bell and Bumper 25 EC) were applied as early cover spray applications code A and B. Chemical fungicide Proline EC 250 (application code C) was used as the fungicide reference to biocontrol treatments. *C. rosea* strain IK726 was applied at application code C (½ day before inoculation with *Fusarium*) or D (one day after inoculum with *Fusarium*).

Test Products 2015+2016

Chemical Fungicides:
  Proline EC 250 (prothioconazole 250 g/l);
  Rubric (epoxiconazole 125 g/l).
BCAs:
  *C. rosea* strain IK726;
  *P. chlororaphis* strain MA342;
  *C. rosea* strain IK726+*P. chlororaphis* strain MA342.

Chemical fungicide (Proline 0.3 l/ha and Rubric 0.5 l/ha) were applied in reduced dosages as early cover spray applications code A and B respectively. Chemical fungicide Proline EC 250 0.8 l/ha (application code C) was used as the fungicide reference to biocontrol treatments. *C. rosea* strain IK726 was applied at application code C either alone or combined with *P. chlororaphis* MA342. *P. chlororaphis* MA342 was also applied alone at application code C. Dosages used in combined BCA-mixes and reduced dosages of BCA is described above under application of BCAs and indicated in Table 2 and 3.

Test Products 2017

Chemical Fungicides:
  Viverda+Ultimate S (boscalid 140 g/l+epoxiconazool 50 g/l+pyraclostrobin 60 g/l);
  Prosaro 250 EC (tebuconazole 125 g/l+prothioconazole 125 g/l).

BCAs:
*C. rosea* strain IK726;
*C. rosea* strain 1829 (denoted CR1 in Table 4);
*C. rosea* strain 1882 (denoted CR2 in Table 4);
*C. rosea* strain 2177 (denoted CR3 in Table 4);
*C. rosea* strain CBS 103.94 (denoted CR4 in Table 4).

Chemical fungicide (Viverda+Ultimate S) was applied at early cover spray application code A. The *C. rosea* strains IK726, 1829, 1882, 2177 and CBS 103.94 were applied as an early application and a late application (application code A+B) or only at the late application as a single application (application code B). *C. rosea* strain IK726 was also tested as a single early application (application code A). Chemical fungicide Prosaro 250 EC (application code B) was used as the fungicide reference to biocontrol treatments.

Results

Results 2013

There was significant control of STB on leaf 2 by *C. rosea* IK726 in Treatment nos. 7, 8 and 9. These three treatments with biological control were not significant different from each other. The treatment with chemical fungicides (Treatment no. 6) also achieved a significant control of STB.

TABLE 1

Control of STB on wheat 2013

| | | | | | |
|---|---|---|---|---|---|
| Pest Type | | | D Disease | D Disease | |
| Pest Code | | | SEPTTR | SEPTTR | |
| Pest Scientific Name | | | Septoria triti | Septoria triti | |
| Crop Code | | | TRZAW | TRZAW | |
| Crop Name | | | Winter wheat | Winter wheat | |
| Part Rated | | | LEAF 2 C | LEAF 3 C | |
| Rating Date | | | Jun. 27, 2013 | Jun. 27, 2013 | |
| Rating Type | | | PESSEV | PESSEV | |
| Crop Stage | | | 69 | 69 | |
| Crop Stage Scale | | | BBCH | BBCH | |

| Trt no. | Treatment name | Rate (l/ha) | Appl Code | 1 | 2 |
|---|---|---|---|---|---|
| 1 | Bell | 0.5 | A | $3.3^a$ | $2.8^a$ |
| | Bumper 25 EC | 0.25 | A | | |
| | Bell | 0.5 | B | | |
| | Bumper 25 EC | 0.25 | B | | |
| | Untreated control | | D | | |
| 6 | Bell | 0.5 | A | $1.6^b$ | $1.4^a$ |
| | Bumper 25 EC | 0.25 | A | | |
| | Bell | 0.5 | B | | |
| | Bumper 25 EC | 0.25 | B | | |
| | Proline EC 250 | 0.8 | D | | |
| 7 | Bell | 0.5 | A | $0.6^b$ | $0.9^a$ |
| | Bumper 25 EC | 0.25 | A | | |
| | Bell | 0.5 | B | | |
| | Bumper 25 EC | 0.25 | B | | |
| | IK726 | 1 | C | | |
| 8 | Bell | 0.5 | A | $1.8^b$ | $2.8^a$ |
| | Bumper 25 EC | 0.25 | A | | |
| | Bell | 0.5 | B | | |
| | Bumper 25 EC | 0.25 | B | | |
| | IK726 | 1 | D | | |
| 9 | Bell | 0.5 | A | $1.4^b$ | $2.5^a$ |
| | Bumper 25 EC | 0.25 | A | | |
| | Bell | 0.5 | B | | |
| | Bumper 25 EC | 0.25 | B | | |
| | IK726 | 1 | CD | | |

| | | |
|---|---|---|
| LSD (P = 0.05) | 1.03 | 1.26 |
| Standard Deviation | 0.70 | 0.86 |
| CV | 50.65 | 47.16 |
| Bartlett's X2 | 19.056 | 8.376 |
| P(Bartlett's X2) | 0.015* | 0.398 |
| Replicate F | 1.011 | 0.916 |
| Replicate Prob(F) | 0.4053 | 0.4478 |

TABLE 1-continued

Control of STB on wheat 2013

| | | |
|---|---|---|
| Treatment F | 5.856 | 2.591 |
| Treatment Prob(F) | 0.0003 | 0.0339 |

All plots were inoculated with a mixture of *Fusarium graminearum*+*Fusarium culmorum* on Jun. 17, 2013 at GS 65. All biological control treatments with *C. rosea* were done either one day before (Treatment no. 7 Appl. Code C) or one day after (Treatment no. 8 Appl. Code D) or both one day before and one day after (Treatment no. 9 Appl. Code C+D) inoculation with *Fusarium* spp.

There were significant control of STB on leaf 2 by *C. rosea* IK726 in Treatment nos. 7, 8 and 9. These three treatments with biological control were not significant different from each other. The chemical fungicide treatment (Treatment no. 6) was showing a significant control of STB on leaf 2. No effects were registered on leaf 3.

Result 2015

Treatment nos. 3, 5, 8 and 9 showed significant disease control of STB. Of these Treatment nos. 5 and 8 showed significant effect with *C. rosea* in combination with the BCA *P. chlororaphis*. Treatment no. 7 also showed a biocontrol effect of the bacterial BCA on its own. Treatment nos. 10 and 11 were not significant probably due to the lower dose of *C. rosea* inoculum used in these treatments. The chemical treatment no. 2 was also significant.

TABLE 2

Control of STB on wheat 2015

| | |
|---|---|
| Pest Type | D Disease |
| Pest Code (SEPTTR = *Septoria tritici*) | SEPTTR |
| Crop Code | TRZAW |
| Crop Name | Winter wheat |
| Part Rated | LEAF 1 P |
| Rating Date | Jul. 15, 2015 |
| Rating Type (PESSEV = Pest-severity) | PESSEV |
| Rating Unit | % |
| Crop Stage Majority | 75 |
| Crop Stage Scale | BBCH |
| Assessed By | LNJ |
| Days After First/Last Application | 79    23 |
| Treatment-Evaluation Interval | −21 DA-A |

| Trt No. | Treatment Name | Rate | Appl Code | |
|---|---|---|---|---|
| 1 | Proline EC 250 | 0.3 | A | $15.5^a$ |
| | Rubric | 0.5 | B | |
| 2 | Proline EC 250 | 0.3 | A | $2.1^c$ |
| | Rubric | 0.5 | B | |
| | Proline EC 250 | 0.8 | C | |
| 3 | Proline EC 250 | 0.3 | A | $7.8^b$ |
| | Rubric | 0.5 | B | |
| | IK726 | 100 | C | |
| 4 | Proline EC 250 | 0.3 | A | $10.8^{ab}$ |
| | Rubric | 0.5 | B | |
| | MA342 | 100 | C | |
| 5 | Proline EC 250 | 0.3 | A | $7.5^b$ |
| | Rubric | 0.5 | B | |
| | IK726 + MA342 | 100 | CC | |
| 6 | Proline EC 250 | 0.3 | A | $12.5^{ab}$ |
| | Rubric | 0.5 | B | |
| | IK726 | 50 | C | |
| 7 | Proline EC 250 | 0.3 | A | $8.8^b$ |
| | Rubric | 0.5 | B | |
| | MA342 | 50 | C | |
| 8 | Proline EC 250 | 0.3 | A | $7.5^b$ |
| | Rubric | 0.5 | B | |
| | IK726 + MA342 | 50 | C | |

TABLE 2-continued

Control of STB on wheat 2015

| | | | | |
|---|---|---|---|---|
| 9 | Proline EC 250 | 0.3 | A | 9.3$^b$ |
| | Rubric | 0.5 | B | |
| | IK726 | 10 | CC | |
| 10 | Proline EC 250 | 0.3 | A | 11.5$^{ab}$ |
| | Rubric | 0.5 | B | |
| | MA342 | 10 | C | |
| 11 | Proline EC 250 | 0.3 | A | 123$^{ab}$ |
| | Rubric | 0.5 | B | |
| | IK726 + MA342 | 10 | C | |

| | |
|---|---|
| LSD P = .05 | 395 |
| Standard Deviation | 274 |
| CV | 2.856 |
| Bartlett's X2 | 5.151 |
| P(Bartlett's X2) | 0.881 |
| Replicate F | 0.643 |
| Replicate Prob(F) | 5.937 |
| Treatment F | 6.635 |
| Treatment Prob(F) | 0.001 |

Rate unit: l/ha for chemical treatments and BCAs is in % of full dose (see Material and Methods).

All biological control treatment either with *C. rosea* IK726 alone, *P. chlororaphis* strain MA342 alone or with combinations of these two BCAs were done at Jun. 22, 2015 (application code C). Therefore, the effects on STB of BCA treatments were only seen after that date. The determination on disease severity was done Jul. 15, 2015.

Treatment nos. 3, 5, 8 and 9 showed significant disease control of STB. Of these Treatment nos. 5 and 8 showed significant effect of *C. rosea* in combination with the biocontrol bacteria *P. chlororaphis*. Treatment no. 7 also showed a biocontrol effect of the bacterial BCA on its own. Treatment nos. 10 and 11 were not significant, probably due to the lower dose of *C. rosea* inoculum used in these treatments. The chemical treatment no. 2 was also significant.

Results 2016

Significant biocontrol of STB compared to the untreated control was found on leaf 1 on Jun. 29, 2016 in all treatments with *C. rosea* IK726 either as a single treatment (Treatment nos. 3, 6, 9+12) or in combination with *P. chlororaphis* MA342 (Treatment nos. 5, 8). *P. chlororaphis* MA342 also had significant effects as single applications (Treatment nos. 4, 7+10) on Jun. 29, 2016. Significant biocontrol effects were also seen on leaf 2 in almost all treatments already at Jun. 14, 2016 ten days after application of the biocontrol organisms (application code C).

TABLE 3

Control of STB on wheat 2016

| | 1 D Disease | 1 D Disease | 1 D Disease | 1 D Disease |
|---|---|---|---|---|
| Pest ID Code | | | | |
| Pest Code | SEPTTR | SEPTTR | SEPTTR | SEPTTR |
| Crop ID Code | 1 TRZAW | 1 TRZAW | 1 TRZAW | 1 TRZAW |
| Crop Name | Winter wheat | Winter wheat | Winter wheat | Winter wheat |
| Crop Variety | Nakskov | Nakskov | Nakskov | Nakskov |
| Part Rated | LEAF 2 P | LEAF 1 P | LEAF 2 P | LEAF 1 P |
| Rating Date | Jun. 14, 2016 | Jun. 29, 2016 | Jun. 29, 2016 | Jul. 5, 2016 |
| Rating Type | PESSEV | PESSEV | PESSEV | PESSEV |
| Rating Unit | % | % | % | % |
| Crop Stage Majority | 65 | 75 | 75 | 77 |
| Crop Stage Scale | BBCH | BBCH | BBCH | BBCH |
| Treatment-Evaluation Interval | 10 DA-C | 25 DA-C | 25 DA-C | 31 DAC- |
| Plant-Evaluation Interval | 274 DP-1 | 289 DP-1 | 289 DP-1 | 295 DP-1 |

| Trt No. and Name, Rate | Appl Code | 2 | 4 | 5 | 8 |
|---|---|---|---|---|---|
| 1 Proline EC250 0.3 l/ha | AB | 3.3$^{ab}$ | 26.3$^{ab}$ | 70.0$^a$ | 83.8$^a$ |
| 2 Proline EC250 0.3 l/ha | AB | 1.3$^c$ | 10.0$^e$ | 36.3$^b$ | 48.8$^b$ |
| 2 Proline EC250 0.8 l/ha | C | | | | |
| 3 Proline EC250 0.3 l/ha | AB | 2.3$^{abc}$ | 20.0$^{bcd}$ | 42.5$^{ab}$ | 80.0$^a$ |
| 3 IK726 | CC | | | | |
| 4 Proline EC250 0.3 l/ha | AB | 1.8$^{bc}$ | 15.0$^{de}$ | 37.5$^{ab}$ | 67.5$^{ab}$ |
| 4 MA342 | C | | | | |
| 5 Proline EC250 0.3 l/ha | AB | 1.8$^{bc}$ | 18.8$^{b-e}$ | 57.5$^{ab}$ | 78.8$^a$ |
| 5 IK726 | C | | | | |
| 5 MA342 | C | | | | |
| 6 Proline EC250 0.3 l/ha | AB | 2.3$^{abc}$ | 20.0$^{bcd}$ | 46.3$^{ab}$ | 67.5$^{ab}$ |
| 6 IK726 | C | | | | |
| 7 Proline EC250 0.3 l/ha | AB | 2.0$^{bc}$ | 18.8$^{b-e}$ | 46.3$^{ab}$ | 72.5$^{ab}$ |
| 7 MA342 | C | | | | |
| 8 Proline EC250 0.3 l/ha | AB | 1.8$^{bc}$ | 16.3$^{cde}$ | 46.3$^{ab}$ | 72.5$^{ab}$ |
| 8 IK726 | C | | | | |
| 8 MA342 | C | | | | |
| 9 Proline EC250 0.3 l/ha | AB | 2.5$^{abc}$ | 15.0$^{de}$ | 35.0$^b$ | 79.2$^a$ |
| 9 IK726 | C | | | | |
| 10 Proline EC250 0.3 l/ha | AB | 2.0$^{bc}$ | 18.8$^{b-e}$ | 47.5$^{ab}$ | 72.5$^{ab}$ |
| 10 MA342 | C | | | | |
| 11 Proline EC250 0.3 l/ha | AB | 1.8$^{bc}$ | 25.0$^{abe}$ | 55.0$^{ab}$ | 81.3$^a$ |
| 11 IK726 | C | | | | |
| 11 MA342 | C | | | | |
| 12 Proline EC250 0.3 l/ha | AB | 2.5$^{abc}$ | 18.8$^{b-e}$ | 56.3$^{ab}$ | 77.5$^a$ |
| 12 IK726 | C | | | | |
| 13 Proline EC250 0.3 l/ha | AB | 2.3$^{abc}$ | 20.5$^{bcd}$ | 58.8$^{ab}$ | 71.3$^{ab}$ |
| 13 MA342 | C | | | | |

TABLE 3-continued

Control of STB on wheat 2016

| Pest ID Code | 1 D Disease | 1 D Disease | 1 D Disease | 1 D Disease |
|---|---|---|---|---|
| Pest Code | SEPTTR | SEPTTR | SEPTTR | SEPTTR |
| Crop ID Code | 1 TRZAW | 1 TRZAW | 1 TRZAW | 1 TRZAW |
| Crop Name | Winter wheat | Winter wheat | Winter wheat | Winter wheat |
| Crop Variety | Nakskov | Nakskov | Nakskov | Nakskov |
| Part Rated | LEAF 2 P | LEAF 1 P | LEAF 2 P | LEAF 1 P |
| Rating Date | Jun. 14, 2016 | Jun. 29, 2016 | Jun. 29, 2016 | Jul. 5, 2016 |
| Rating Type | PESSEV | PESSEV | PESSEV | PESSEV |
| Rating Unit | % | % | % | % |
| Crop Stage Majority | 65 | 75 | 75 | 77 |
| Crop Stage Scale | BBCH | BBCH | BBCH | BBCH |
| Treatment-Evaluation Interval | 10 DA-C | 25 DA-C | 25 DA-C | 31 DAC- |
| Plant-Evaluation Interval | 274 DP-1 | 289 DP-1 | 289 DP-1 | 295 DP-1 |

| Trt No. and Name, Rate | Appl Code | 2 | 4 | 5 | 8 |
|---|---|---|---|---|---|
| 14 Untreated control | | $3.8^a$ | $30.0^a$ | $70.0^a$ | $90.0^a$ |
| LSD P = 0.05 | | 0.93 | 5.66 | 18.49 | 15.67 |
| Standard Deviation | | 0.66 | 3.98 | 12.98 | 11.00 |
| CV | | 29.53 | 20.41 | 25.73 | 14.61 |
| Bartlett's X" | | 13.48 | 14.649 | 28.825 | 15.938 |
| P(Bartlett's X") | | 0.411 | 0.33 | 0.04* | 0.317 |
| Replicate F | | 4.417 | 3.119 | 1.486 | 9.918 |
| Replicate Prob(F) | | 0.0083 | 0.0352 | 0.2311 | 0.0001 |
| Treatment F | | 3.408 | 5.705 | 2.886 | 2.869 |
| Treatment Prob(F) | | 0.0007 | 0.0001 | 0.0030 | 0.0033 |

All plots were inoculated with *Fusarium* spp. in the same way as in 2013 and 2015. There was no inoculation with *Septoria tritici*. Dose IK726: $6.8 \times 10^6$ cfu/m$^2$; MA342: $4.5 \times 10^8$ cfu/m$^2$.

Significant biocontrol of STB compared to the untreated control was found on Jun. 29, 2016 in all treatments with *C. rosea* IK726 either as a single treatment (Treatment nos. 3, 6, 9+12) or in combination with *P. chlororaphis* MA342 (Treatment nos. 5 and 8). An exception was treatment no. 11. *P. chlororaphis* MA342 also had significant effects as single applications (Treatment nos. 4, 7+10) on Jun. 29, 2016.

Significant biocontrol effects were also seen on leaf 2 in several BCA-treatments already at Jun. 14, 2016 ten days after application of the biocontrol organisms (application code C).

Results 2017

All five isolates of *C. rosea* showed significant effect on STB on leaf L2 on Jun. 26, 2017 and in all treatments on leaf L1, Jul. 6, 2017 except on Treatment no. 4 (application code B of *C. rosea* IK726 leaf L1). There were significant effects of all biocontrol treatments with the late treatments (application code B treatments except Leaf L1 Treatment no. 4), and in all treatments with both an early and a late application of *Clonostachys* spp. (Application code A+B for both leaf L1 assessed on Jul. 6, 2017 and L2 assessed on Jun. 26, 2017 (Treatment nos. 5, 7, 11, 13)). Disease assessment on leaf L1 at Jun. 26, 2017 showed no significant biological disease control and the late disease assessment Jul. 17, 2017 did not show significant biological disease control effects. The early treatment with *C. rosea* IK726 (application code A Treatment no. 3) showed a significant biological disease control on leaf L1 on Jul. 6, 2017 and on leaf L2 on Jun. 26, 2017. The other four isolates were not tested for an early single application (application code A).

All five tested *C. rosea* isolates gave significant biological disease control effects against STB.

TABLE 4

Control of STB on wheat 2017

| | | | | D Disease | D Disease | D Disease | D Disease | D Disease |
|---|---|---|---|---|---|---|---|---|
| | Pest Type | | | SEPTTR | SEPTTR | SEPTTR | SEPTTR | PUCCRT |
| | Pest Code | | | Speckled leaf | Speckled leaf | Speckled leaf | Speckled leaf | Brown rust |
| | Pest Name | | | TRZAW | TRZAW | TRZAW | TRZAW | TRZAW |
| | Crop Code | | | Winter wheat | Winter wheat | Winter wheat | Winter wheat | Winter wheat |
| | Crop Name | | | L1 | L2 | L1 | L1 C | L1 P |
| | Part Rated | | | 26 Jun. 2017 | 26 Jun. 2017 | 6 Jul. 2017 | 17 Jul. 2017 | 26 Jun. 2017 |
| | Rating Date | | | PESSEV | PESSEV | PESSEV | PESSEV | PESSEV |
| | Rating Type | | | % | % | % | % | % |
| | Rating Unit | | | 73 | 73 | 77 | 83 | 77 |
| | Crop Stage Majority | | | | | | | |
| Trt no. | Trt name | Rate (l/ha) | Appl Code | | | | | |
| 1 | Untreated control | | | 6.0a | $22.5^a$ | $31.3^a$ | $100.0^a$ | $5.00^a$ |
| 2 | Viverda | 0.75 | A | $1.3^b$ | $7.8^c$ | $2.0^d$ | $20.0^c$ | $0.03^c$ |
| | Ultima S | 0.75 | A | | | | | |
| | Prosaro 250 EC | 0.75 | B | | | | | |
| 3 | IK726 | | A | $3.0^{ab}$ | $15.0^b$ | $18.8^{bc}$ | $100.0^a$ | $3.25^{ab}$ |
| 4 | IK726 | | B | $3.5^{ab}$ | $14.3^b$ | $25.0^{ab}$ | 100.0a | $2.50^b$ |

TABLE 4-continued

Control of STB on wheat 2017

| | | | | | | | |
|---|---|---|---|---|---|---|---|
| 5 | IK726 | A B | $4.0^{ab}$ | $15.0^{b}$ | $20.3^{bc}$ | 100.0a | $3.75^{ab}$ |
| 6 | CR1 | B | $4.3^{ab}$ | $14.5^{b}$ | $19.3^{bc}$ | $100.0^{a}$ | $4.00^{ab}$ |
| 7 | CR1 | A B | $4.3^{ab}$ | $16.5^{b}$ | $20.0^{bc}$ | $100.0^{a}$ | $2.75^{ab}$ |
| 8 | CR2 | B | $4.5^{ab}$ | $14.3^{b}$ | $21.3^{bc}$ | $100.0^{a}$ | $3.25^{ab}$ |
| 9 | CR2 | A B | $6.0^{a}$ | $17.3^{b}$ | $20.8^{bc}$ | $100.0^{a}$ | $3.50^{ab}$ |
| 10 | CR3 | B | $4.0^{ab}$ | $15.0^{b}$ | $17.3^{bc}$ | $100.0^{a}$ | $4.50^{ab}$ |
| 11 | CR3 | A B | $3.3^{ab}$ | $12.3^{b}$ | $13.8^{c}$ | $100.0^{a}$ | $3.00^{ab}$ |
| 12 | CR4 | B | $3.5^{ab}$ | $15.0^{b}$ | $22.0^{bc}$ | $100.0^{a}$ | $2.25^{b}$ |
| 13 | CR4 | A B | $3.5^{ab}$ | $15.0^{b}$ | $22.5^{bc}$ | $100.0^{a}$ | $2.75^{ab}$ |
| 14 | Viverda Ultimate S 075 0.75 | A A | $1.5^{b}$ | $6.5^{c}$ | $3.3^{d}$ | $38.8^{b}$ | $0.00^{c}$ |
| LSD P = 0.05 | | | 1.92 | 3.38 | 6.27 | 1.88 | |
| Standard Deviation | | | 1.34 | 2.36 | 4.39 | 1.31 | |
| CV | | | 35.74 | 16.47 | 23.87 | 1.46 | |
| Bartlett's X2 | | | 13.381 | 10.257 | 18.877 | 0.686 | |
| P(Bartlett's X2) | | | 0.342 | 0.507 | 0.127 | 0.407 | |
| Skewness | | | 0.6866* | 0.2575 | -0.4743 | -2.1947* | |
| Kurtosis | | | 0.4176 | 2.5955* | -0.1992 | 3.1088* | |
| Replicate F | | | 1.100 | 1.575 | 0.583 | 0.258 | |
| Replicate Prob(F) | | | 0.3607 | 0.2109 | 0.6299 | 0.8550 | |
| Treatment F | | | 4.046 | 10.553 | 12.483 | 1553.424 | |

Five different *Clonostachys rosea* isolates were tested in 2017 for their effects against STB. All 14 treatments were artificially inoculated with a mixture of *Fusarium graminearum*+*Fusarium culmorum* on Jun. 17, 2017 at GS 65.

Conclusions

*C. rosea* gave significant biocontrol of *Septoria tritici* in the field experiments 2013, 2015, 2016 and 2017 and the effects were also seen when combined with the bacterial strain *P. chlororaphis* MA342. Significant biocontrol effect on STB were seen with all five different *C. rosea* strains tested in 2017. In 2017 a significant control of brown rust was also registered in treatment 4 and 12, i.e., significant biocontrol effect of strains IK726 and CBS 103.94.

Example 2—Growth Rate Measurements on Agar Media

Agar plugs with actively growing mycelium of *Clonostachys rosea* strains were inoculated to ½ strength potato dextrose agar (PDA) medium (Oxoid, Cambridge, UK) plates supplemented with 0.005 μg/mL (final concentration) prothioconazole (proline), ½ strength PDA plates supplemented with 0.25 mg/mL (final concentration) iprodione, and incubated at 25° C. in darkness. Half strength PDA plates inoculated with *C. rosea* strains were also incubated at 10° C. in darkness. Growth rates were measured continuously up to 24 days after inoculation. All strains grew on prothioconazole (Table 5), iprodione (Table 6) and at 10° C. (Table 7).

TABLE 5

Growth rates of *Clonostachys rosea* strains on ½ strength potato dextrose agar plates supplemented with 0.005 μg/mL (final concentration) prothioconazole incubated at 25° C.

| Isolate | Growth rate (mm/day) | Geographic origin |
|---|---|---|
| CBS 125111 | 0.50828 | Costa Rica |
| CBS 118757 | 0.546527 | Taiwan |
| GR4 | 0.627859 | Denmark |
| 1832 | 0.644491 | Slovenia |
| CBS 907.72D | 0.6469 | Armenia |
| CBS 916.97 | 0.652807 | Mexico |
| CBS 649.80 | 0.668938 | Tunisia |
| 2176 | 0.67493 | Slovenia |
| CBS 154.27 | 0.677755 | USA |
| CBS 376.55 | 0.683262 | USA |
| 2177 | 0.684474 | Slovenia |
| 1830 | 0.68476 | Slovenia |
| CBS 221.72A | 0.689512 | Germany |
| GR3 | 0.692515 | France |
| 1829 | 0.694287 | Slovenia |
| CBS 569.69 | 0.71023 | Switzerland |
| GR33 | 0.710817 | New Zealand |
| CBS 124004 | 0.712142 | USA |
| 1827 | 0.713249 | Slovenia |
| CBS 361.77 | 0.721543 | Switzerland |
| 2175 | 0.734558 | Slovenia |
| 1316 | 0.739356 | Slovenia |
| 1883 | 0.742277 | Slovenia |
| 1833 | 0.74739 | Slovenia |
| 1421 | 0.747664 | Slovenia |
| CBS 704.97 | 0.765966 | USA |
| CBS 100502 | 0.766587 | France |
| 2169 | 0.776618 | Slovenia |
| 2178 | 0.777547 | Slovenia |
| 2173 | 0.780467 | Slovenia |
| 1881 | 0.792988 | Slovenia |
| GR5 | 0.797603 | Denmark |
| CBS 148.72 | 0.798337 | Ukraine |
| CBS 123305 | 0.80167 | USA |
| CBS 222.93 | 0.813856 | Chile |
| CBS 289.78 | 0.817591 | Jamaica |
| CBS 706.97 | 0.826584 | USA |
| GR31 | 0.832212 | Guyana |
| CBS 708.97 | 0.833506 | USA |
| 1701 | 0.852914 | Slovenia |
| CBS 907.72E | 0.85595 | Armenia |
| CBS 287.78 | 0.858387 | USA |

TABLE 5-continued

Growth rates of *Clonostachys rosea* strains on ½ strength potato dextrose agar plates supplemented with 0.005 µg/mL (final concentration) prothioconazole incubated at 25° C.

| Isolate | Growth rate (mm/day) | Geographic origin |
|---|---|---|
| CBS 178.28 | 0.863012 | UK |
| CBS 277.50 | 0.872287 | USA |
| CBS 224.72A | 0.890177 | Germany |
| CBS 443.65 | 0.908239 | USA |
| GR34 | 0.90985 | New Zealand |
| CBS 907.72G | 0.912405 | Azerbaijan |
| 1885 | 0.924951 | Slovenia |
| CBS 421.87 | 0.933981 | Spain |
| CBS 193.94 | 0.957985 | Venezuela |
| CBS 115883 | 1.000103 | Argentina |
| 1884 | 1.001669 | Slovenia |
| CBS 548.79 | 1.014388 | Venezuela |
| CBS 438.70 | 1.016561 | Japan |
| CBS 705.97 | 1.021988 | USA |
| CBS 188.33 | 1.033165 | Netherlands |
| CBS 100000 | 1.063344 | Australia |
| CBS 216.74 | 1.070359 | Brazil |
| CBS 103.94 | 1.125649 | Netherlands |
| IK726 | 1.125649 | Denmark |
| GR35 | 1.13811 | New Zealand |
| 1882 | 1.142264 | Slovenia |

TABLE 6

Growth rates of *Clonostachys rosea* strains on ½ strength potato dextrose agar plates supplemented with 0.25 mg/mL (final concentration) iprodione incubated at 25° C.

| Isolate | Growth rate (mm/day) | Geographic origin |
|---|---|---|
| CBS 118757 | 0.22908 | Taiwan |
| CBS 224.72A | 0.234299 | Germany |
| CBS 569.69 | 0.2873 | Switzerland |
| CBS 124004 | 0.29383 | USA |
| 1833 | 0.302251 | Slovenia |
| CBS 704.97 | 0.312949 | USA |
| GR34 | 0.3275 | New Zealand |
| 1421 | 0.329032 | Slovenia |
| 2169 | 0.340836 | Slovenia |
| 2177 | 0.353698 | Slovenia |
| 2176 | 0.367742 | Slovenia |
| CBS 708.97 | 0.402363 | USA |
| CBS 115883 | 0.412506 | Argentina |
| CBS 287.78 | 0.418006 | USA |
| 2175 | 0.424437 | Slovenia |
| CBS 100000 | 0.454324 | Australia |
| 1701 | 0.457068 | Slovenia |
| GR4 | 0.464888 | Denmark |
| 2173 | 0.469453 | Slovenia |
| GR5 | 0.496246 | Denmark |
| CBS 125111 | 0.527172 | Costa Rica |
| CBS 289.78 | 0.540885 | Jamaica |
| 1832 | 0.551679 | Slovenia |
| CBS 548.79 | 0.57273 | Venezuela |
| CBS 222.93 | 0.6 | Chile |
| CBS 154.27 | 0.603602 | USA |
| CBS 376.55 | 0.623608 | USA |
| CBS 907.72G | 0.643087 | Azerbaijan |
| CBS 443.65 | 0.65083 | USA |
| 2178 | 0.692132 | Slovenia |
| CBS 193.94 | 0.715312 | Venezuela |
| GR33 | 0.74639 | New Zealand |
| CBS 907.72E | 0.763602 | Armenia |
| CBS 123305 | 0.765273 | USA |
| CBS 907.72D | 0.787504 | Armenia |
| GR31 | 0.85582 | Guyana |
| 1829 | 0.879756 | Slovenia |
| CBS 216.74 | 0.892599 | Brazil |
| CBS 421.87 | 0.904653 | Spain |
| 1827 | 0.910107 | Slovenia |

TABLE 6-continued

Growth rates of *Clonostachys rosea* strains on ½ strength potato dextrose agar plates supplemented with 0.25 mg/mL (final concentration) iprodione incubated at 25° C.

| Isolate | Growth rate (mm/day) | Geographic origin |
|---|---|---|
| CBS 100502 | 0.930687 | France |
| CBS 221.72A | 0.943972 | Germany |
| CBS 706.97 | 0.982157 | USA |
| 1881 | 0.993548 | Slovenia |
| 1884 | 1 | Slovenia |
| CBS 916.97 | 1.00555 | Mexico |
| 1885 | 1.014609 | Slovenia |
| CBS 148.72 | 1.067278 | Ukraine |
| CBS 103.94 | 1.070907 | Netherlands |
| CBS 649.80 | 1.111289 | Tunisia |
| CBS 361.77 | 1.130197 | Switzerland |
| IK726 | 1.178589 | Denmark |
| CBS 178.28 | 1.194224 | UK |
| 1883 | 1.207089 | Slovenia |
| 1830 | 1.209003 | Slovenia |
| CBS 277.50 | 1.232943 | USA |
| 1316 | 1.272108 | Slovenia |
| GR3 | 1.351616 | France |
| CBS 705.97 | 1.445161 | USA |
| GR35 | 1.451613 | New Zealand |
| CBS 188.33 | 1.528335 | Netherlands |
| CBS 438.70 | 1.604191 | Japan |
| 1882 | 1.664516 | Slovenia |

TABLE 7

Growth rates of *Clonostachys rosea* strains on ½ strength potato dextrose agar plates incubated at 10° C.

| Isolate | Radius (mm after 24 days at 10° C.) | Geographic origin |
|---|---|---|
| CBS 708.97 | 1.583 | USA |
| 1881 | 3.083 | Slovenia |
| IK726 | 3.167 | Denmark |
| GR34 | 3.667 | New Zealand |
| CBS 704.97 | 3.833 | USA |
| 1827 | 4.167 | Slovenia |
| 1885 | 4.167 | Slovenia |
| CBS 706.97 | 4.417 | USA |
| CBS 277.50 | 4.500 | USA |
| CBS 569.69 | 4.583 | Switzerland |
| CBS 649.80 | 4.667 | Tunisia |
| 1829 | 4.667 | Slovenia |
| GR3 | 4.667 | France |
| CBS 100000 | 4.833 | Australia |
| 1884 | 5.000 | Slovenia |
| 1830 | 5.167 | Slovenia |
| CBS 222.93 | 5.250 | Chile |
| CBS 115883 | 5.250 | Argentina |
| CBS 907.72G | 5.333 | Azerbaijan |
| CBS 287.78 | 5.417 | USA |
| CBS 916.97 | 5.417 | Mexico |
| 1833 | 5.583 | Slovenia |
| CBS 100502 | 5.583 | France |
| CBS 548.79 | 5.750 | Venezuela |
| 1701 | 6.250 | Slovenia |
| CBS 148.72 | 6.667 | Ukraine |
| 1883 | 6.667 | Slovenia |
| CBS 907.72D | 6.750 | Armenia |
| CBS 421.87 | 6.833 | Spain |
| 2176 | 7.083 | Slovenia |
| GR31 | 7.083 | Guyana |
| GR5 | 7.417 | Denmark |
| CBS 289.78 | 7.667 | Jamaica |
| CBS 154.27 | 7.833 | USA |
| 1316 | 7.833 | Slovenia |
| 2177 | 7.833 | Slovenia |

TABLE 7-continued

Growth rates of Clonostachys rosea strains on ½ strength potato dextrose agar plates incubated at 10° C.

| Isolate | Radius (mm after 24 days at 10° C.) | Geographic origin |
|---|---|---|
| CBS 178.28 | 8.000 | UK |
| CBS 216.74 | 8.000 | Brazil |
| GR35 | 8.250 | New Zealand |
| CBS 125111 | 8.333 | Costa Rica |
| CBS 907.72E | 8.417 | Armenia |
| 2178 | 8.583 | Slovenia |
| CBS 193.94 | 8.917 | Venezuela |
| GR33 | 9.500 | New Zealand |
| CBS 376.55 | 9.583 | USA |
| CBS 438.70 | 9.583 | Japan |
| CBS 705.97 | 9.583 | USA |
| CBS 188.33 | 9.833 | Netherlands |
| 1832 | 9.833 | Slovenia |
| 1882 | 9.917 | Slovenia |
| CBS 103.94 | 11.250 | Netherlands |

The results indicate that *C. rosea* strains are tolerant towards commonly used fungicides and can thereby be combined with chemical treatment of STB.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

Jensen, B., Knudsen, I. M. B., and Jensen, D. F. 2002. Survival of conidia of *Clonostachys rosea* coated on barley seeds and their biocontrol efficacy against seed-borne *Bipolaris sorokiniana*. Biocontrol Sci. Technol. 12:427-441.

Lancashire, P. D., Bleiholder, H., van den Boom, T., Langelüddeke, P., Stauss, R., Weber, E. and Witzenberger, A. (1991). A uniform decimal code for growth stages of crops and weeds. Ann. Appl. Biol. 119: 561-601.

SEQUENCE LISTING

The patent contains a lengthy sequence listing. A copy of the sequence listing is available in electronic form from the USPTO web site (https://seqdata.uspto.gov/?pageRequest=docDetail&DocID=US12185725B2). An electronic copy of the sequence listing will also be available from the USPTO upon request and payment of the fee set forth in 37 CFR 1.19(b)(3).

The invention claimed is:

1. A method of inhibiting and/or controlling *Septoria tritici* blotch (STB) caused by *Mycosphaerella graminicola*, said method comprising treating a wheat plant infected by *M. graminicola* with *Clonostachys rosea* in an amount effective to inhibit and/or control the STB, or with a biological control agent (BCA) composition comprising *C. rosea* in an amount effective to inhibit and/or control the STB and at least one auxiliary compound, wherein the method is conducted in the absence of a chemical fungicide.

2. The method according to claim 1, wherein treating said wheat plant comprises spraying said *C. rosea* or said BCA composition onto at least a portion of said wheat plant.

3. The method according to claim 2, wherein spraying said *C. rosea* or said BCA composition comprises spraying said *C. rosea* or said BCA composition onto at least one of a pre-stem extension, a stem extension, and a leaf of said wheat plant.

4. The method according to claim 1, wherein *C. rosea* is selected from the group consisting of *C. rosea f. rosea*, *C. rosea f. catenulata*, and a mixture thereof.

5. The method according to claim 1, wherein *C. rosea* is selected from the group consisting of *C. rosea* strain IK726, strain 1829, strain 1882, strain 2177, strain CBS 103.94, and a mixture thereof.

6. The method according to claim 1, wherein said at least one auxiliary compound comprises a surfactant.

7. The method according to claim 1, wherein said at least one auxiliary compound comprises at least one insecticide.

8. The method according to claim 7, wherein said at least one insecticide is furathiocarb.

9. The method according to claim 1, wherein said at least one auxiliary compound comprises at least one herbicide.

10. The method according to claim 9, wherein said at least one herbicide is selected from the group consisting of an acetyl coenzyme A carboxylase inhibitor, an acetolactate synthase inhibitor, an enolpyruvylshikimate 3-phosphate synthase inhibitor, a synthetic auxin herbicide, a photosystem II inhibitor, a photosystem I inhibitor, a 4-hydroxyphenylpyruvate dioxygenase inhibitor, and a mixture thereof.

11. The method according to claim 1, wherein said at least one auxiliary compound comprises at least one BCA other than *C. rosea*.

12. The method according to claim 11, wherein said at least one BCA other than *C. rosea* is selected from the group consisting of a *Bacillus* BCA, a *Serratia* BCA, a *Trichoderma* BCA, *Metarhizium brunneum*, *Glomus intraradices*, a *Pseudomonas* BCA, and a mixture thereof.

13. The method according to claim 1, wherein treating the wheat plant comprises treating wheat plant infected by *M. graminicola* with said *C. rosea* or said BCA composition at a late growth stage selected within a range of growth stage 61 to 89.

14. The method according to claim 6, wherein said at least one auxiliary compound comprises a nonionic surfactant.

15. The method according to claim 6, wherein said at least one auxiliary compound comprises a polysorbate surfactant.

16. The method according to claim 6, wherein said at least one auxiliary compound comprises 0.01 or 0.1% polysorbate 20.

17. The method according to claim 1, wherein treating the wheat plant comprises treating the wheat plant infected by *M. graminicola* with said *C. rosea*.

* * * * *